United States Patent Office 3,436,567
Patented Apr. 1, 1969

3,436,567
METHOD OF AND APPARATUS FOR HEATING A FLUID BY MEANS OF AN AUXILIARY FLUID AT HIGH PRESSURE
Eric Brocher, 108, chemin de la Montagne, Chene-Bougerie, Geneva, Switzerland
Filed July 26, 1966, Ser. No. 567,948
Claims priority, application Switzerland, July 27, 1965, 10,492/65
Int. Cl. H02n 4/02
U.S. Cl. 310—11                    9 Claims This invention relates to a method of and to apparatus for heating a fluid by means of a high pressure auxiliary fluid, which permit temperatures to be attained which can go up to several times those from conventional sources of heat. The invention is concerned also with the application of this method to an electricity generator of the so-called magnetohydrodynamic type in which the enthalpy of a moving ionized gas, termed the work fluid, is converted into electricity by passing this gas through a magnetic field.

The generation of heat on an industrial scale at temperature ranging from 1500° to several thousands of degrees centigrade poses important practical problems, particularly in the choice of an appropriate source of heat and of refractory materials capable of withstanding contact with fluids at such temperatures.

It has already been proposed to heat a gas by compression through shock waves produced by means of an auxiliary fluid at high pressure. Such heating has the advantage of enabling the gas heated by compression and the cooler auxiliary gas to pass alternately into a shock tube, so that this tube is not continually exposed to the high temperature of the heated gas.

The ionization of gases and the behaviour of ionized gases flowing through a magnetic field have been the subject of many studies, particularly with a view to using these gases for the production of electricity. It is known that the electrical conductivity of a gas is a function of its temperature and that the specific power as well as the overall efficiency of a magnetohydrodynamic generator can be improved by increasing the temperature of the work fluid.

In the method according to the present invention, it is proposed to subject a fluid to be heated to repeated compression by means of shock waves, and to intermediate isoenthalpic expansions by means of a magnetohydrodynamic "constriction," so as to raise its temperature to any desired level.

To this end, the method according to the invention is characterized in that the fluid to be heated and the auxiliary fluid at a higher pressure, are introduced alternately and periodically into at least one shock tube which is blocked off cyclically so as to effect a compression by shock wave, thereby to raise the temperature of the fluid to be heated to a level at which its electrical conductivity is raised to at least 0.1 mho/m., that this conductive fluid is subjected to expansion by passing it on the one hand through a magnetic field transverse to the general direction of its flow and on the other hand between at least two short-circuited electrodes disposed parallel to this field on opposite sides of this fluid, that the latter is separated from the auxiliary fluid, and that the fluid to be heated is again subjected to one or several shock wave compressions, each followed by expansion by passing through the magnetic field, so as to heat this fluid by stages up to a desired temperature.

The application of this process to a magnetohydrodynamic generator, in order to preheat the work fluid of the latter, is characterized in that the work fluid is subjected to at least two shock wave compressions by means of the auxiliary high pressure fluid and to an intermediate expansion in the generator whose electrodes have been short-circuited, so as to attain a desired temperature of preheating for this fluid before using it to produce electrical energy in the generator, the electrodes being then connected to an external load.

The apparatus for carrying out the process according to the invention is characterized in that it comprises a compressor serving to compress the auxiliary fluid coming from a reservoir for this fluid, a heat generator serving to preheat to a temperature of at least 700° C. the auxiliary fluid discharged by the compressor as well as the fluid to be heated coming from a reservoir for this fluid, at least one shock tube, a first cyclically controlled three-way distributor connected to the generator and disposed at the inlet, and a second cyclically controlled three-way distributor disposed at the tube outlet, these two distributors being arranged in such a manner as to bring alternately the two preheated fluids into this tube, to produce shock waves therein, and to separate again the two fluids at the outlet of the tube, means to produce, upstream of this outlet, a magnetic field transverse to the axis of this tube, at least two diametrically opposed electrodes disposed parallel to this field in the vicinity of the tube wall and connected to one another externally of the latter so as to short-circuit them, two recycling conduits for returning each of the said fluids from the second distributor to the first, the recycling conduit for the auxiliary fluid passing through the compressor and the heat generator, and two three-way valves each serving to isolate one of the reservoirs and to put one of these conduits into communication with the first distributor.

For a better understanding of the invention and to show how it may be carried into effect, the same will now be described by way of example with reference to the accompanying drawings, in which:

FIGURE 3 is a schematic axial section of an embodiment of a pressure exchanger comprising several shock tubes;

FIGURE 4 is a cross-section along line A—A of FIGURE 3; and

FIGURE 5 is a cross-section along line B—B of FIGURE 3.

Figure 1:
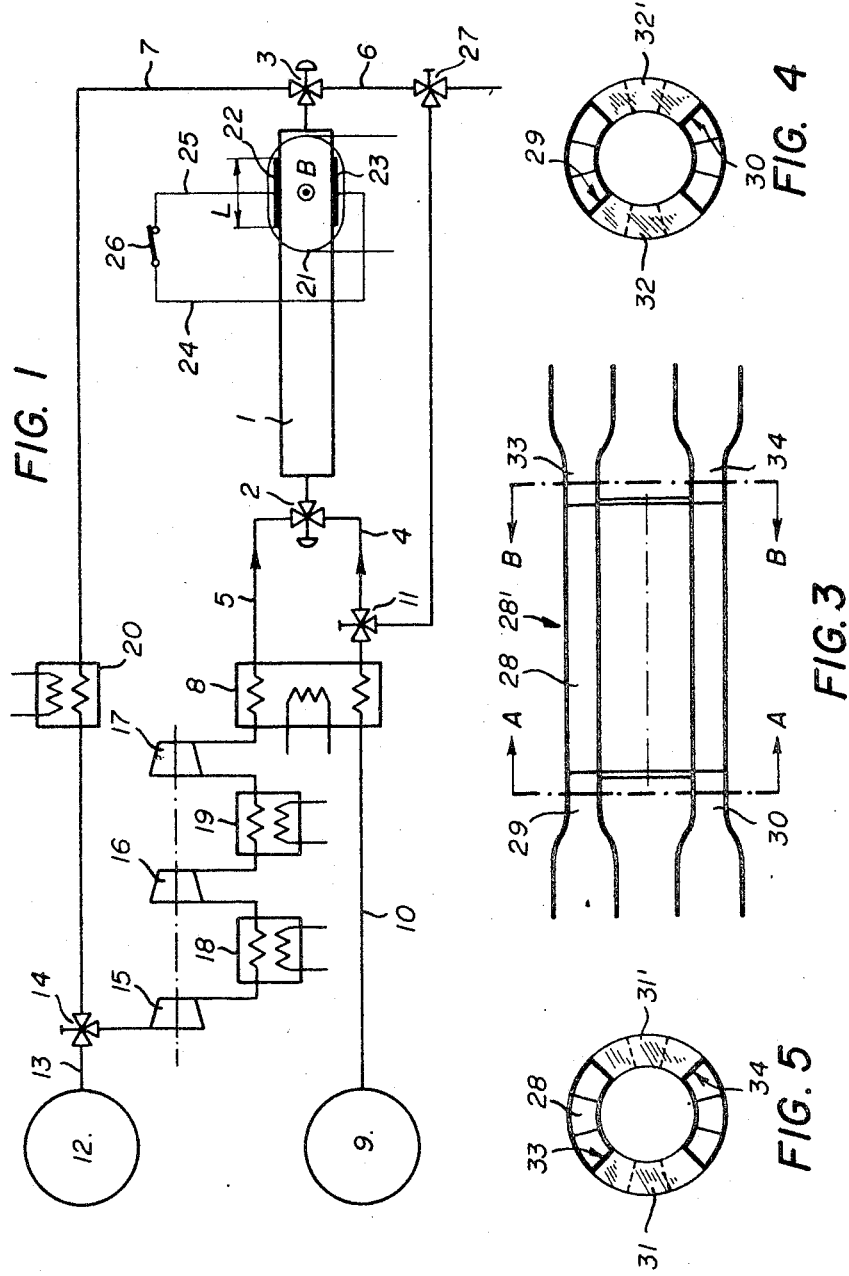
FIGURE 1 is a schematic representation of an embodiment of the apparatus according to the invention.

The apparatus illustrated in FIGURE 1 comprises a fixed shock tube 1 whose inlet and outlet are respectively connected, via rotary three-way distributors 2 and 3, to the inlet conduits 4, 5 and to the outlet conduits 6, 7 for the fluid to be heated and for the auxiliary fluid, respectively. A heat exchanger 8, heated by a conventional source of heat, serves to preheat these two fluids to a temperature greater than 700° C. The fluid to be heated, coming from a reservoir 9, passes through a conduit 10, the exchanger 8 and a three-way valve 11 in the inlet conduit 4. The auxiliary fluid, coming from a reservoir 12, passes through a conduit 13 and a second three-way valve 14 in the first stage 15 of a compressor having three stages 15, 16 and 17 and including two intermediate coolers 18 and 19. The compressed auxiliary fluid then passes through the generator 8 into the inlet conduit 5 and into the inlet distributor 2. The latter is arranged in such a manner as to introduce the two fluids alternately into the shock tube 1 during predetermined periods. The distributor 3 is arranged in such manner as to block off the outlet of the tube 1 after the gas to be heated has been introduced therein and while the compressed auxiliary gas is being introduced therein. The control of the two distributors 2 and 3 is synchronized so as to cause, in the tube 1, a shock wave which compresses the fluid to be heated and raises its temperature to a level such that its electrical conductivity reaches at least 1 mho/m. The distributor 3 serves at the same time to separate the successive batches of the two fluids and to send them to their respective outlet conduits 6 and 7 which return them to the three-way valves 11 and 14, respectively.

The recycling conduit 7 for the auxiliary fluid passes through a heat exchanger 20 which cools the auxiliary fluid down to its starting temperature.

The shock tube 1 includes, upstream of its outlet, a portion of length L in which are provided means, represented schematically by the winding 21, which serve to generate a uniform transverse magnetic field extending along the entire length L. The field lines, obtained by means of the winding 21 and represented schematically by the point B, are substantially parallel to one another and are perpendicular to the axis of the tube, and in the present instance, perpendicular to the plane of the drawing. Two diametrically opposed electrodes 22 and 23 are disposed in the vicinity of the inner surface of the tube 1 along the entire length L and are substantially parallel to the direction of the magnetic field B. As seen in FIGURE 1, the electrodes 22 and 23 are galvanically connected by the lines 24 and 25 so as to short-circuit them when a contact 26 is closed.

In the apparatus described above, the fixed shock tube 1 and the rotary distributors 2 and 3 constitute a pressure exchanger which enables a large part of the pressure energy of the auxiliary fluid to be transferred to the gas to be heated. Due to the rapid relative movement of the rotary distributors 2 and 3 with respect to the fixed tube 1, it is possible to put the two fluids of different pressures into sudden contact. Thus the high pressure auxiliary fluid acts as a piston on the fluid to be heated which is at low pressure, while heating the latter by shock wave compression.

This heating by compression permits the gas to be heated to be ionized so as to render it electrically conductive, namely permits it to attain an electrical conductivity which is greater than 0.1 mho/m. The passage of the conductive gas through the magnetic field B, causes it to undergo an isoenthalpic expansion, which is explained later on. Its pressure thus drops thereby enabling it to be introduced again into the shock tube to be compressed, that is to say, to be heated once again. During this isoenthalpic expansion, its temperature remains substantially constant. Thus the successive compressions, followed by the said expansions make it possible to raise the temperature of the fluid to be heated to any desired level. A three-way valve 27 enables the heated fluid to be discharged and sent to its place of use, or possibly, to an appropriate reservoir.

The use of a conventional heat source in the exchanger 8 for preheating purposes enables the installation to operate more economically. Moreover, such preheating makes it possible to resort to lower compression ratios in the cycle of the auxiliary fluid.

Figure 2:
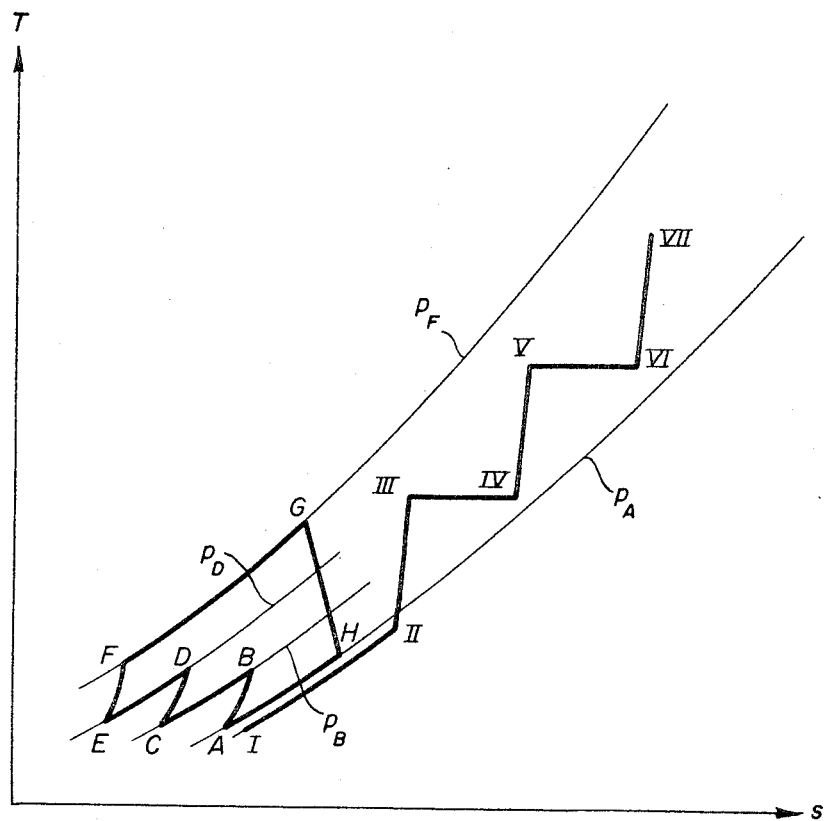
FIGURE 2 shows the thermodynamic cycles effected respectively by the fluid to be heated and by the auxiliary fluid in the apparatus illustrated in FIGURE 1.

FIGURE 2 shows, in an entropy diagram indicating the absolute temperature T and the pressure P as a function of the entropy S, the thermodynamic cycles of the auxiliary fluid and of the fluid to be heated, such as taking place in the apparatus described hereabove.

The cycle A–B–C–D–E–F–G–H–A of the auxiliary fluid is made up of the following stages:

A–B: first compression stage in stage 15 of the compressor,
B–C: intermediate cooling in the cooler 18,
C–D: second compression stage in stage 16 of the compressor,
D–E: intermediate cooling in the cooler 19,
E–F: third compression stage in stage 17 of the compressor,
F–G: heating in the exchanger 8,
G–H: expansion in the shock tube 1,
H–A: cooling in the exchanger 20 down to the starting temperature (point A).

The cycle I–II–III–IV–V–VI–VII of the fluid to be heated comprises the following stages:

I–II: preheating in the exchanger 8,
II–III: first compression in the shock tube 1,
III–IV: isoenthalpic expansion in the magnetic field B,
IV–V: second compression in the shock tube 1,
V–VI: second isoenthalpic expansion,
VI–VII: third compression in the shock tube 1.

The compression and the isoenthalpic expansion operations of the fluid to be heated are repeated until this fluid has reached the desired temperature which can, in principle, have any high value.

The rise in temperature during each compression in the gas to be heated depends on the intensity of the shock wave that is produced; the greater the pressure of the auxiliary gas is with respect to the pressure of the gas to be heated, the greater the shock wave will be. The intensity of the shock wave depends also on the nature of the two gases; for a given gas to be heated and a given pressure ratio the intensity of the shock wave is greater when the auxiliary gas has a high speed of sound, that is to say, when it is light and hot.

For example, if the gas to be heated is air, calculations give the factors of temperature increase through the shock wave as follows:

| | | | |
|---|---|---|---|
| (a) When the auxiliary gas is also air: | | | |
| Pressure ratio | 5 | 10 | 100 |
| Temperature increase factor | 1.24 | 1.42 | 2.05 |
| (b) When the auxiliary gas is hydrogen $H_2$: | | | |
| Pressure ratio | 5 | 10 | 100 |
| Temperature increase factor | 1.52 | 1.81 | 4.88 |

These figures show that if the gas to be heated is not preheated, an adequate temperature increase factor, and hence a sufficient conductivity, can only be achieved during the first when the auxiliary gas is light and when the pressure ratios are high.

Thus it is particularly advantageous to preheat both the gas to be heated and the auxiliary gas. First, the speed of sound in the auxiliary gas will be increased. And second, with a preheating temperature of 1300° K., for example, there will be no restriction as regards the choice of the auxiliary gas, and a pressure ratio of 5 is sufficient to obtain a temperature of 1600° K. behind the shock wave already at the stage of the first cycle, this temperature being sufficient to achieve a conductivity greater than 1 mho/m. in a seeded gas.

Thus, by suitably choosing the auxiliary gas and its pressure, the gas to be heated can, in all cases, be made to have good electrical conductivity by means of the shock wave compression in tube 1.

After each compression, the distributor 3 opens to discharge the conductive gas followed by the relaxed auxiliary gas. When the conductive gas flows through the magnetic field B in tube 1, it undergoes isoenthalpic expansion.

This isoenthalpic expansion of the gas could be explained in the following manner:

The electrodes 22, 23 being short-circuited, an electric current $j$ passes through the conductive gas when the latter flows through the magnetic field. The value of this current $j$ is equal to $\sigma u B$ ($\sigma$ being the electrical conductivity, $u$ the speed of the gas, and B the intensity of the magnetic field). Moreover, the electrodes being short-circuited, no electrical energy is delivered to the external circuit. The energy of the gas, that is to say its total enthalpy, thus remains constant along the length L, even though an electric current is passing through the gas. Yet, its pressure decreases. Indeed, it can be shown by applying the equations of motion to the gas that when $u$ is constant, the pressure gradient along this portion 20 of length L is equal to $$dp/dL = \sigma u B^2$$

If $\sigma$ is substantially constant along this portion 20 (which is the case since the total temperature of the gas will not vary during isenthalpic expansion), the pressure drop along L will be given by $$\Delta p = \sigma u B^2 L$$

The length of the portion 20 can thus be expressed in the following manner:

$$L = \Delta p / \sigma u B^2$$

which can be written:

$$L = 100 \Delta p / \sigma u B^2$$

with $\Delta p$ expressed in atmospheres, $\sigma$ in mho/m., $u$ in $10^3$ m./s. and B in webers/m.$^2$ (1 weber/m.$^2$ = 10,000 gauss).

At present, magnetic fields of the order of 10,000 gauss can easily be produced. When $\Delta p = 1$ atm. and $u = 10^3$ m./s., and if it is desired that $L = 1$ m., $\sigma$ must equal 100 mhos/m. Such a conductivity can be obtained in gases seeded with a small percentage of alkali metal at temperatures ranging from 2300° K. to 3000° K. depending on the nature of the gas.

In the rather near future, it will be possible to produce, with superconducting materials, magnetic fields of the order of 100,000 gauss on a large scale and without an excessive expenditure of energy. For the same $\Delta p$ and $u$ ($\Delta p = 1$ atm., $u = 10^3$ m./s.), $L = 1$ m. will be obtained with a conductivity $\sigma$ of 1 mho/m. This conductivity can be obtained at temperatures from 1500 to 2000° K. for seeded gases and at temperatures around 4000° K. for nonseeded gases.

The pressure exchanger shown in FIGURE 3 comprises a large number of shock tubes 28 mounted symmetrically in the form of a barrel 28' which turns at high speed. The input conduits of the high pressure auxiliary gas and the gas to be heated lead respectively into end parts 29, 30 in the form of annular segments each disposed facing the inlets of several successive shock tubes. FIGURE 4 shows, in addition to the parts 29, 30 in the form of annular segments, intermediate elements 32, 32' adapted to block off the inlets to the tubes 28 during predetermined periods. Thus each of the fluids is introduced progressively into a tube, when the latter passes opposite either of the fixed parts 29 and 30. At the outlet of the barrel 28', the tubes 28 lead into the channels 33 and 34 serving respectively to discharge the fluid to be heated, which has been compressed by shock wave, and the relaxed auxiliary fluid. As is seen in FIGURE 5, the channels 33 and 34 have inlet sections analogous to the outlet sections of the parts 29, 30, but which are peripherally offset with respect to these latter. The intermediate elements 31, 31' block off the outlet of the tubes 28, during predetermined periods. Due to the rapid rotary movement of the shock tubes 28 past the fixed parts 29, 30 and 33, 34, it is possible to bring the two fluids at different pressures into abrupt contact, so as to produce each time a shock wave in these tubes.

The above described embodiment of the pressure exchanger permits of the compressing a large quantity of fluid to be heated. The fluid thus heated by compression in several tubes at the same time, then passes through the pipe 34 to a common expansion channel (not shown) where it flows through a magnetic field B which corresponds in principle to that shown in the terminal path of the shock tube 1 in FIGURE 1. The fluid having undergone isenthalpic expansion while flowing through the magnetic field is then returned to the pipe 30 where it is reintroduced into the barrel 28' to undergo further compression. This cycle of the fluid to be heated is repeated until it has attained the desired temperature.

I claim:

1. A method of heating a fluid by means of a high pressure auxiliary fluid comprising the steps of:

(i) introducing the fluid to be heated into a shock tube, (ii) introducing the auxiliary fluid at a higher pressure into the shock tube in a manner so as to generate a shock wave to compress the fluid to be heated in the shock tube, thereby to raise the temperature of the fluid to be heated to a level at which the electrical conductivity of the fluid to be heated is raised to at least 0.1 mho/m., (iii) expanding the electrically conductive fluid to be heated by passing the fluid to be heated through a magnetic field transverse to the general direction of flow of the fluid to be heated, and by passing the fluid to be heated simultaneously between two short-circuited electrodes disposed parallel to the magnetic field, (iv) removing the fluid to be heated and the auxiliary fluid from the shock tube, (v) separating the fluid to be heated from the auxiliary fluid, (vi) reintroducing the fluid to be heated into the shock tube, (vii) reintroducing the auxiliary fluid into the shock tube in a manner so as to generate a shock wave to compress the fluid to be heated in the shock tube, thereby to raise further the temperature of the fluid to be heated, (viii) and repeating steps (iii), (iv) and (v).

2. A method according to claim 1 including the further steps of cyclically repeated steps (vi), (vii), (iii), (iv) and (v) until a desired temperature is attained.

3. A method according to claim 1 in which the step of removing the fluid to be heated and the auxiliary fluid from the shock tube is carried out after the step of expanding the fluid to be heated.

4. A method according to claim 1 in which the step of removing the fluid to be heated and the auxiliary fluid from the shock tube is carried out before the step of expanding the fluid to be heated.

5. A method according to claim 1 including the preliminary step of seeding the fluid to be heated with a small percentage of alkali metal.

6. A method of generating electricity magneto-hydrodynamically comprising the steps of:

(i) preheating a work fluid according to the method claim 1, (ii) compressing the preheated work fluid by means of a shock wave generated by the auxiliary fluid, (iii) breaking the short-circuit between the two electrodes and connecting these electrodes to an external load, (iv) and expanding the electrically conductive work fluid by passing it through the transverse magnetic field and simultaneously between the two electrodes, thereby generating electricity for the external load.

7. A method of generating electricity magnetohydrodynamically on a commercial scale according to claim 6.

8. Apparatus for heating a fluid by means of a high pressure auxiliary fluid comprising:

(i) a compressor adapted to compress the auxiliary fluid, (ii) a heat generator adapted to preheat both the fluid to be heated and the compressed auxiliary fluid to a temperature of 700° C., (iii) at least one shock tube, (iv) inlet means and outlet means for this shock tube adapted to introduce alternately the fluid to be heated and the auxiliary fluid into the shock tube to compress the fluid to be heated in the shock tube by means of a shock wave, said outlet means being further adapted to permit the two fluids to pass out of the shock tube and to separate the two fluids after they have passed out of the shock tube, (v) means to produce a magnetic field in a part of the shock tube transverse with respect to the axis of the shock tube, (vi) at least two spaced apart electrodes disposed parallel to the fluid and short-circuited externally of the tube,
(vii) a first recycling conduit for recycling the auxiliary fluid from said outlet means back to said inlet means, said first recycling conduit passing through said compressor,
(viii) and a second recycling conduit for recycling the fluid to be heated from said outlet means back to said inlet means.

9. Apparatus according to claim 8 in which each of said inlet means and said outlet means comprises a cyclically controlled three-way distributor, and including a first reservoir for the auxiliary fluid, said first reservoir being connected to said first recycling conduit by means of a first three-way valve, and a second reservoir for the fluid to be heated, said second reservoir being connected to said second recycling conduit by means of a second three-way valve.

References Cited
UNITED STATES PATENTS

| | | | |
|---|---|---|---|
| 2,992,345 | 7/1961 | Hansen | 313—63 |
| 3,161,789 | 12/1964 | Nagamatsu et al. | 310—11 |
| 3,321,919 | 5/1967 | Marolda | 60—202 |

DAVID X. SLINEY, *Primary Examiner.*